United States Patent Office 3,260,722
Patented July 12, 1966

3,260,722
5-METHYL RESERPINE AND A PROCESS
OF MAKING SAME
Leon Velluz, Paris, and Georges Muller, Nogent sur
Marne, France, assignors, by mesne assignments, to
Roussel-UCLAF, S.A., Paris, France, a corporation of
France
No Drawing. Filed Feb. 19, 1959, Ser. No. 794,222
Claims priority, application France, Feb. 27, 1958,
759,277
4 Claims. (Cl. 260—287)

The present invention relates to new reserpine compounds and more particularly to 5-methyl reserpine and its C<sub>5</sub>-stereoisomers, and to a process of making same.

It is one object of the present invention to provide the new and valuable 5a-methyl reserpine which has similar physiological properties as reserpine.

Another object of the present invention is to provide a simple and effective process of producing said 5-methyl reserpine.

A further object of the present invention is to provide a process of separating the two C<sub>5</sub>-stereo-isomeric forms of 5-methyl reserpine.

Other objects of the present invention and advantageous features thereof will become apparent as the description proceeds.

The new 5-methyl reserpine corresponds to the following Formula XI:

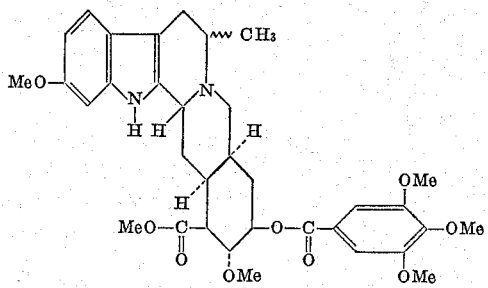

The two stereoisomeric forms of 5-methyl reserpine differ only in the spatial position of the methyl group on the carbon atom 5 as indicated by a wavy line. The one isomer the rotary power of which is $[\alpha]_D^{20} = -108°$ (concentration: 0.5% in chloroform) will be designated hereinafter and in the claims annexed hereto as 5a-methyl reserpine of Formula XIa and the other isomer the rotatory power of which is $[\alpha]_D^{20} = -136°$ (concentration: 0.25% in chloroform) will be designated as 5b-methyl resperine of Formula XIb.

In the same manner the intermediates of this reaction will be distinguished from each other by dividing them into compounds of the a-series and compounds of the b-series depending upon whether they yield 5a-methyl reserpine or 5b-methyl reserpine.

In principle, the process according to the present invention consists in condensing racemic 1-(6′-methoxy-3′-indoyl)-2-proylamine of Formula I, prepared according to copending, commonly assigned patent application Serial No. 760,536 of Andre Allais, filed September 12, 1958 and entitled, "Tryptamine Compound and Process of Making the Same," now abandoned, with the methyl ester of 1β-carboxy methyl-2β-methoxy carbonyl-3α-methoxy-4β-acetoxy-6β-formyl cyclohexane. Said acid of the optical rotation $[\alpha]_D^{20} = +42.5°$ (concentration: 1% in pyridine) is prepared according to copending, commonly assigned patent application Serial No. 727,780, filed April 11, 1958, and entitled, "Process of Producing a Substituted Aldehyde," now United State Patent No. 2,971,978.

To produce 1-(6′-methoxy-3′-indoyl)-2-propylamine, 6-methoxy indole is subjected to the action of dimethyl formamide and phosphorus oxychloride; the resulting 3-formyl-6-methoxy indole is reacted with nitro ethane in the presence of piperidine in a neutral solvent such as benzene, preferably by refluxing the reaction mixture for 4 to 6 hours. The resulting 1-(6′-methoxy-3′-indolyl)-2-nitro-1-propene is then reduced by lithium aluminum hydride, preferably in anhydrous tetrahydrofuran. 1-(6′-methoxy-3′-indolyl)-2-propylamine obtained thereby is isolated in the form of its crystallized picrate which is decomposed by the action of an alkali metal hydroxide solution, preferably by means of a lithium hydroxide solution.

The other condensation component, the methyl ester of 1β-carboxy methyl-2β-methoxy carbonyl-3α-methoxy-4β-acetoxy-6β-formyl cyclohexane is prepared by treating the methyl ester of 3β-acetoxy-2α-methoxy-7-oxo-1,2,3,4,4aα,7,8,8aα-octahydronaphthalene-1β - carboxylic acid with ozone at a temperature not exceeding —15° C. in solution in a solvent, such as ethyl acetate, methyl acetate, cyclohexane, methylene chloride, or chloroform. The resulting ozonide is decomposed, also at a temperature not exceeding —15° C. by means of water in the presence of 0.2–2.0% of a phenolic antioxidant such as hydroquinone. The reaction temperature is then slowly and gradually increased first to 0° C. and then to 30–35° C. The resulting aldo carboxylic acid is purified by converting it into an aqueous solution of its sodium salt, also in the presence of 0.2–2.0% of a phenolic antioxidant. On acidifying the solution of the sodium salt at a temperature below 10° C., the aldo carboxylic acid, i.e., the 1β-carboxy methyl-2β-methoxy carbonyl-3α-methoxy-4β-acetoxy-6β-formyl cyclohexane is obtained which is then esterified to yield the corresponding methyl ester.

The condensation of these two reaction components is effected in an inert solvent such as methylene chloride. It yields a mixture of the C<sub>5</sub>-isomers of the methyl ester of 18β-acetoxy-11,17α-dimethoxy-16β-methoxy carbonyl-5-methyl-2-3,3-4-diseco-Δ<sup>4(21)</sup>,20α-yohimbene-3 - carboxylic acid of Formula III. Said acid is subjected to the action of an alkali metal boronhydride in alcoholic solution. By reduction of the double bond and subsequent ring closure accompanied by partial saponification, 18β-hydroxy-11,17α-dimethoxy-16β-methoxy carbonyl-5-methyl-3-oxo-2-3-seco-20α-yohimbane of Formula IV is prepared. Said compound is saponified to yield 16β-carboxy-18β-hydroxy-11,17α-dimethoxy-5-methyl-3-oxo-2-3 - seco - 20α-yohimbane of Formula V, which is converted into the corresponding lactone of Formula VI. The stereoisomers of Formulas VIa and VIb are separated by making use of the insolubility of the 5a-methyl isomer in ethyl acetate. The two compounds thus obtained are cyclized by means of phosphorus oxychloride to yield the corresponding lactones of 16β-carboxy-18β-hydroxy-11,17α-dimethoxy-5-methyl-Δ<sup>3</sup>,20α-yohimbene in the form of the quaternary base of Formula VII. Said lactones are reduced by means of a boronhydride in an alcoholic solution to the lactones of 16β-carboxy-18β-hydroxy-11,17α-dimethoxy-5-methyl-3α,20α-yohimbane of Formula VIII. Said compounds are converted into their 3β-isomers by the action of formic acid. The lactones of 16β-carboxy-18β-hydroxy-11,17α-dimethoxy-5-methyl-3β,20α - yohimbane, of Formula IX, thus prepared, are subjected to methanolysis and yield thereby 18β-hydroxy-11,17α-dimethoxy-16β-methoxy carbonyl-5 - methyl - 3β,20α - yohimbane of Formula X which is esterified with 3,4,5-trimethoxy benzoyl chloride. After purifying the resulting ester, the desired 5-methyl reserpines of Formula XI are obtained.

The new stereoisomeric levorotatory 5a-methyl reserpine is a compound of the reserpine series and has similar physiological properties. It is useful as a tranquilizing agent and has a considerable blood pressure reducing effect in addition to other interesting pharmacodynamic properties.

The following examples serve to illustrate the present invention without, however, limiting the same thereto. More particularly, the conditions and/or the order of the reaction steps may be varied, the nature of the solvents, acids, or bases used may be modified, the separation of the isomers may be effected at another stage of the synthesis, and other changes and variations may be made by those skilled in the art in accordance with the principles set forth herein and in the claims annexed hereto. Final esterification is preferably carried out by following the procedure described by Robert Joly, Robert Bucourt, and Edmond Toromanoff in copending, commonly assigned patent application Serial No. 727,782, filed April 11, 1958, and entitled, "Esters of Compounds of the Reserpine Series and Process of Making Same," now U.S. Patent No. 2,926,167, issued February 23, 1960. According to said process 3,4,5-trimethoxy benzoic anhydride is reacted with 18β-hydroxy-11,17α-dimethoxy-16β-methoxy carbonyl-5-methyl-3β,20α-yohimbane of Formula X in the presence of a pyridine based and of triethylamine. The melting points given in the examples are instantaneous melting points, determined on the Maquenne block. The formula sheets attached at the end of the specification serve to illustrate the process according to the present invention.

EXAMPLE 1

*Preparation of the methyl ester of 18β-acetoxy-11,17α-dimethoxy-16β-methoxy carbonyl-5-methyl - 2-3,3-4 - di-seco-$\Delta^{4(21)}$,20α-yohimbene-3-carboxylic acid of Formula III*

(A) SETTING FREE THE TRYPTAMINE COMPOUND FROM ITS PICRATE 200 cc. of methylene chloride and 100 cc. of a 10% aqueous lithium hydroxide solution are added to 10 g. of the picrate of 1-(6'-methoxy-3'-indolyl)-2-propylamine of Formula I, prepared according to the above mentioned patent application Serial No. 760,536. The mixture is stirred until complete dissolution is achieved. After decanting the organic layer, the aqueous layer is extracted twice with methylene chloride. The combined organic layers and wash liquids are then washed with lithium hydroxide solution and water and dried over potassium hydroxide. The dried solution is filtered and distilled to dryness. 6 g. of a residue containing considerable amounts of solvent solvated therewith are obtained as residue representing the free amine.

(B) PREPARATION, BY ESTERIFICATION, OF THE ESTER OF FORMULA II 7.5 g. of 1β-carboxy methyl-2β-methoxy carbonyl-3α-methoxy-4β-acetoxy-6β-formyl cyclohexane (dextrorotatory in pyridine) are esterified in methylene chloride solution by means of diazomethane at 0° C. The solution is concentrated by distillation in a vacuum to a volume of 50 cc.

(C) CONDENSATION

The tryptamine of Formula I, prepared according to (A), is added to the solution of the ester of Formula II, prepared according to (B). The reaction mixture is allowed to stand, protected from light, for half an hour at 0° C. The temperature is allowed to rise slowly to 18° C. and, after half an hour, the mixture is again cooled to 5° C. The compound of Formula III, thus formed, is used without further purification in the following reduction step, This product is new.

EXAMPLE 2

*Preparation of 18β-hydroxy-11,17α-dimethoxy-16β-methoxy carbonyl-5-methyl-3-oxo-2,3-seco-20α - yohimbane of Formula IV*

70 cc. of methanol are added to the Schiff's base of Formula III, prepared from 10 g. of the picrate of the amine of Formula I according to the preceding example and contained in 100 cc. of methylene chloride. 2.5 g. of potassium boronhydride are then added in small portions to said mixture. The reaction mixture is kept in an ice bath for one hour, allowed to stand at room temperature for another hour, and is then refluxed for 65 minutes. Thereafter, the mixture is cooled and acetic acid is added thereto until the pH is 6.0. After the addition of hydrochloric acid to a pH of 1.0, the acidified mixture is extracted by means of methylene chloride. The extracts are washed with water and distilled to dryness. The residue representing the compound of Formula IV containing considerable amounts of solvent solvated therewith, weighs 13.0 g. This compound has not been previously described in the literature.

EXAMPLE 3

*Preparation of 16β-carboxy-18β-hydroxy-11,17α-dimethoxy-5-methyl-3-oxo-2-3-seco-20α-yohimbane of Formula V*

13 g. of the compound of Formula IV, prepared in the form of a solvated resin according to the preceding example, are introduced into a solution containing 8 cc. of 10 N sodium hydroxide solution, 35 cc. of methanol, and 18 cc. of water. The mixture is refluxed for one hour. After cooling and addition of water, the mixture is extracted twice with methylene chloride. Hydrochloric acid is added to the aqueous liquid until the pH is 7.0. Thereafter ethyl acetate is added and, finally, hydrochloric acid until the pH is 1.0. The mixture is extracted with ethyl acetate and the extracts are washed with salt water, filtered, and distilled to dryness. This operation is repeated a second time with the aqueous liquids saturated with salt. The combined distillation residues weigh 8.6 g. and consist of the compound of Formula V, which can be used as such without further purification in the steps. This product has not been previously described in the literature.

EXAMPLE 4

*Preparation of the lactone of 16β-carboxy-18β-hydroxy-11,17α-dimethoxy-5-methyl-3-oxo - 2,3-seco-20α-yohimbane of Formula VI and separation of its two $C_5$-isomers*

8.5 g. of the compound of Formula V, prepared in the form of a resin according to the preceding example, 70 cc. of acetic acid, 80 cc. of acetic acid anhydride, and 4 g. of lithium acetate are mixed and heated at 85° C. for 2½ hours. After the addition of water, the resulting solution is allowed to stand at room temperature for 2 hours. The solution is then extracted with methylene chloride and the extracts are washed with water, thereafter with water saturated with sodium bicarbonate, and finally with pure water. The filtered extracts are distilled to dryness in a vacuum and yield 7.5 g. of solvated resin composed of the compound of Formula VI. The residue is dissolved in 15 cc. of ethyl acetate. Crystallization is initiated by seeding and scratching and the crystals are filtered off to give a first portion of 1.08 g. and a second portion of 0.2 g. of a compound designated by Formula VIa; melting point: 230° C.; optical rotation $[\alpha]_D^{20} = -48° \pm 5°$ (concentration: 0.5% in dimethyl formamide).

This compound is soluble in dimethyl formamide, slightly soluble in chloroform and pyridine, and insoluble in ether.

*Analysis.*—$C_{23}H_{28}O_5N_2$; molecular weight: 412.47—
Calculated: 66.97% C; 6.84% H; 19.40% O; 6.79% N.
Found: 66.8% C; 6.9% H; 19.2% O; 6.7% N.

Its infrared spectrum confirms the assumed structure.

The mother liquor is distilled to dryness. The resulting residual resin of 4.8 g. is composed of the isomer of the Formula VIb. It is, however, still contaminated by some VIa-isomer. It is used without further purification in subsequent reaction steps. (See Example 10.)

The two isomers are new products.

EXAMPLE 5

*Preparation of the lactone of 16β-carboxy-18β-hydroxy-11,17α-dimethoxy - 5a - methyl-Δ³, 20α-yohimbene of Formula VIIa (quaternary base)*

780 mg. of the lactam of Formula VIa, prepared according to the preceding example, are refluxed with 4 cc. of phosphorus oxychloride for 2 hours. The reaction mixture is then distilled to dryness in a vacuum. The red resin thus prepared is composed of the new compound of Formula VIIa.

EXAMPLE 6

*Preparation of the lactone of 16β-carboxy-18β-hydroxy-11,17α - dimethoxy - 5a - methyl-3α,20α-yohimbane of Formula VIIIa*

The compound of Formula VIIa, prepared from 780 mg. of the lactam of Formula VIa as described in the preceding example, is dissolved in 10 cc. of methanol at 0° C. Potassium boronhydride is added in small quantities until the pH is between 10.0 and 11.0. Foaming takes place thereby. After the addition of water, crystallization is initiated by scratching. The crystals are filtered and dried. 680 mg. (80%) of a solvated compound are obtained. Melting point: First at about 135–138° C. and again at 250° C.; optical rotation $[\alpha]_D^{20} = -216°$ (concentration: 0.25% in chloroform). This new compound of Formula VIIIa is soluble in chloroform, slightly soluble in ethanol or methanol, and insoluble in ether.

*Analysis.*—$C_{23}H_{28}O_4N_2$; molecular weight: 396.47—Calculated: 69.67% C; 7.12% H; 16.14% O; 7.07% N. Found: 69.7% C; 7.0% H; 16.3% O; 7.0% N.

Its infrared spectrum confirms the assumed structure and in particular permits differentiating the compounds of the 5a-series from their 5b-isomers.

EXAMPLE 7

*Preparation of the lactone of 16β-carboxy-18β-hydroxy-11,17α - dimethoxy - 5a - methyl-3β,20α-yohimbane of Formula IXa*

242 mg. of the compound of Formula VIIIa, obtained according to the preceding example, are refluxed in 3 cc. of formic acid for 15 minutes. The mixture is then cooled in ice, and water and sodium bicarbonate are added until the pH is 8.0. The precipitate is filtered, washed, and dried. Yield: 225 mg. (90%) of the crude compound of Formula IXa. It is redissolved in acetone, filtered, concentrated, cooled in ice, and filtered. 140 mg. of crystals, melting at 280° C. and having an optical rotation $[\alpha]_D^{20} = +19° \pm 1°$ (concentration: 0.25% in chloroform) are obtained. The compound is insoluble in water and ether and slightly soluble in acetone and chloroform.

*Analysis.*—$C_{23}H_{28}O_4N_2$; molecular weight: 396.47—Calculated: 69.67% C; 7.12% H; 16.14% O; 7.07% N. Found: 69.7% C; 7.0% H; 16.4% O; 7.1% N.

Its infrared spectrum confirms the assumed structure. The compound has not been previously described in the literature.

EXAMPLE 8

*Preparation of 18β-hydroxy - 11,17α - dimethoxy-16β-methoxy carbonyl-5a-methyl - 3β,20α - yohimbane of Formula Xa*

4 cc. of methanol containing 1 mg. of metallic sodium per cc. are added to 405 mg. of the lactone of Formula IXa prepared according to the preceding example, in 12 cc. of methanol and the mixture is refluxed for 2 hours. The mixture is cooled in ice. 25 cc. of water are added. The resulting mixture is extracted with methylene chloride. The extracts are washed with water and distilled to dryness, thus yielding 480 mg. of a resin representing the compound of the Formula Xa. This new produce is used directly in the final esterification step.

EXAMPLE 9

*Preparation of 5a-methyl reserpine (levorotatory in pyridine) of Formula XIa*

480 mg. of the compound of Formula Xa, prepared in the form of a resin as described in the preceding example, are mixed with 1.2 g. of 3,4,5-trimethoxy benzoyl chloride and 5 cc. of pyridine. The mixture is heated in a closed vessel in a nitrogen atmosphere at 80° C. for 16 hours. After cooling, a few cc. of water are added and the mixture is heated to 50° C. The resulting solution is allowed to stand for one and a half hours and is then extracted several times with methylene chloride. The extracts are washed with hydrochloric acid, with sodium bicarbonate, and with water and are then distilled to dryness. 1.1 g. of a brown resin are obtained as residue. The resin is dissolved in methanol and 0.6 cc. of 2 N nitric acid is added. On scratching and cooling with ice, the nitrate of 5a-methyl reserpine of Formula XIa crystallizes and is filtered off. It is suspended in a few cc. of methanol and is dissolved by the addition of concentrated ammonia. Water is added and the precipitate is filtered, washed, and dried to yield 485 mg., corresponding to a yield of 80% in the last two steps, of 5a-methyl reserpine of Formula XIa; melting point: about 150° C.; optical rotation $[\alpha]_D^{20} = -108° \pm 10°$ (concentration: 0.5% in chloroform). This compound is new. It is solvated with one mole of water. It is soluble in alcohol, acetone, benzene, and chloroform, and insoluble in ether.

*Analysis.*—$C_{34}H_{42}O_9N_2$; molecular weight: 622.69—Calculated: 65.58% C; 6.80% H; 4.50% N. Found: 65.4% C; 6.7% H; 4.7% N.

Its infrared spectrum confirms the assumed structure.

EXAMPLE 10

*Preparation of the lactone of 16β-carboxy-18β-hydroxy-11,17α-dimethoxy - 5b - methyl-Δ³,20α-yohimbene of Formula VIIb (quaternary base)*

4.8 g. of the compound of Formula VIb, prepared in the form of a resin according to Example 4, are introduced into 9 cc. of phosphorus oxychloride. The mixture is refluxed for 2 hours and is distilled to dryness in a vacuum. The residue is taken up with 30 cc. of methanol. The resulting compound of Formula VIIb is used as such in the following reaction step. It has not been previously described in the literature.

EXAMPLE 11

*Preparation of the lactone of 16β-carboxy-18β-hydroxy-11,17α-dimethoxy-5b-methyl-3α,20α-yohimbane (levorotatory in pyridine) of Formula VIIIb*

Potassium boronhydride is added in small portions to the methanol solution of the compound of Formula VIIb prepared according to the preceding example, until the pH is between 10.0 and 11.0. Water is then added. The aqueous mixture is extracted with methylene chloride. The extracts are distilled to dryness, and the residue composed of the compound of Formula VIIIb is recrystallized from ethyl acetate. 630 mg. of crystals are filtered off. Melting point: 240° C. On recrystallization from ethyl acetate, 500 mg. of crystals are obtained which melt at 245° C.; optical rotation $[\alpha]_D^{20} = -90° \pm 10°$ (concentration: 0.75% in chloroform). The compound is soluble in chloroform and insoluble in ether.

*Analysis.*—$C_{23}H_{28}O_4N_2$; molecular weight: 396.47—Calculated: 69.67% C; 7.12% H; 16.14% O; 7.07% N. Found: 69.9% C; 7.1% H; 16.4% O; 7.1% N.

Its infrared spectrum confirms the assumed structure and distinguishes this product from the 5a-isomer which contaminates the crude reaction product and which is described in Example 6. The 5b-isomer compound has not been previously described in the literature.

EXAMPLE 12

*Preparation of the lactone of 16β-carboxy-18β-hydroxy-11,17α-dimethoxy-5b-methyl-3β,20α-yohimbane of Formula IXb*

200 mg. of the lactone of Formula VIIIb, prepared according to the preceding example, are introduced into 3 cc. of formic acid and the mixture is refluxed for 15 minutes. The mixture is then cooled in ice. Water is added and, thereafter sodium bicarbonate until the pH is 8.0. The precipitate is filtered, washed, and dried. 180 mg. (90%) of the compound of Formula IXb are obtained. Melting point: 320° C.; optical rotation $[\alpha]_D^{20}=+38.5°$ (concentration: 0.25% in chloroform). The compound is purified for analytical purposes whereby, however, the characteristic properties are not changed, by dissolving it in acetone and filtering. This new product is hygroscopic and is insoluble in water and ether.

*Analysis.*—$C_{23}H_{28}O_4N_2$; molecular weight: 396.47—Calculated: 69.67% C; 7.12% H; 16.14% O; 7.07% N. Found: 69.9% C, 7.2% H; 16.3% O; 7.1% N.

Its infrared spectrum confirms the assumed structure.

EXAMPLE 13

*Preparation of 18β-hydroxy-11,17α-dimethoxy-16β-methoxy carbonyl-5b-methyl-3β,20α-yohimbane of Formula Xb*

A mixture consisting of 275 mg. of the compound of Formula IXb, prepared according to the preceding example, 10 cc. of methanol, 4 cc. of tetrahydrofuran, and 2.2 cc. of methanol containing 1 mg. of metallic sodium per cc. is refluxed for two and one half hours. After cooling, water is added and the mixture is extracted with methylene chloride. The extracts are washed until their pH is 7.0 and the washed extracts are distilled to dryness. The residue consisting of the compound of Formula Xb weighs 280 mg. It is used without further purification in the final esterification step. For analytical purposes this new compound is recrystallized from ethyl acetate. It has a melting point of 230° C. and an optical rotation $$[\alpha]_D^{20}=-134°$$

(concentration: 0.25% in chloroform). Its infrared spectrum confirms the assumed structure.

EXAMPLE 14

*Preparation of 5b-methyl reserpine (levorotatory in chloroform) of Formula XIb*

4.5 cc. of pyridine and 1 g. of 3,4,5-trimethoxy benzoyl chloride are added to 280 mg. of the crude compound of Formula Xb prepared according to the preceding example. The mixture is heated in a closed vessel in a nitrogen atmosphere at 80° C. for 16 hours. After cooling, a few cc. of water are added and the mixture is allowed to stand at room temperature for one hour with intermittant stirring. Thereafter, the mixture is extracted with methylene chloride. The extracts are washed successively with hydrochloric acid, water, sodium bicarbonate solution, and again with water and are then distilled to dryness. The residue of 860 mg. is dissolved in 4 cc. of methanol and concentrated nitric acid is added to the solution. The mixture is cooled in ice. The precipitated crystals are filtered off and washed with methanol. The resulting nitrate of 5b-methyl reserpine melts above 250° C. It is suspended in methanol and ammonia is added. First dissolution takes place and, thereafter, the free base crystallizes. After cooling in ice, filtering, and drying 190 mg. of the compound of Formula XIb are obtained. Melting point: 250° C.; optical rotation $[\alpha]_D^{20}=-136°$ (condensation: 0.25% in chloroform). This new product, not previously described in the literature, is obtained in the form of colorless crystals, soluble in chloroform, slightly soluble in acetone and alcohol, and insoluble in water and ether.

*Analysis.*—$C_{34}H_{42}O_9N_2$; molecular weight: 622.69—Calculated: 65.58% C; 6.80% H; 4.50% N. Found: 65.8% C; 6.8% H; 4.8% N.

Its infrared spectrum confirms the assumed structure and in particular distinguishes 5b-methyl reserpine from its 5a-isomer by the characteristic bands in the "Fingerprint Region."

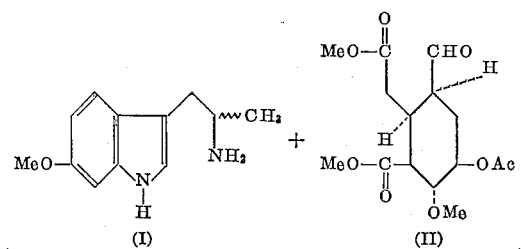

(I)  (II)

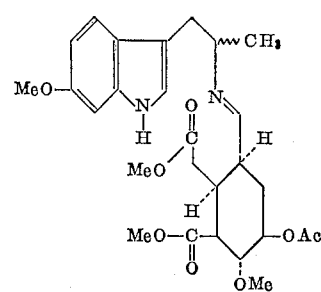

(III)

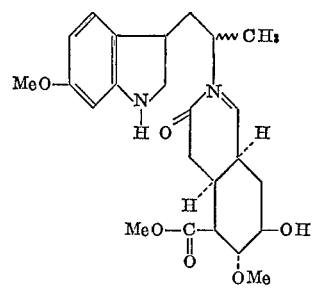

(IV)

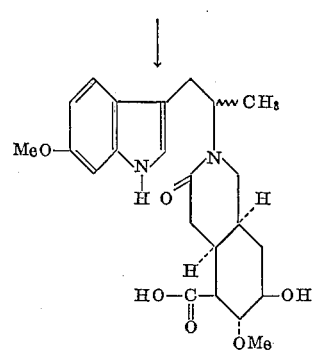

(V)

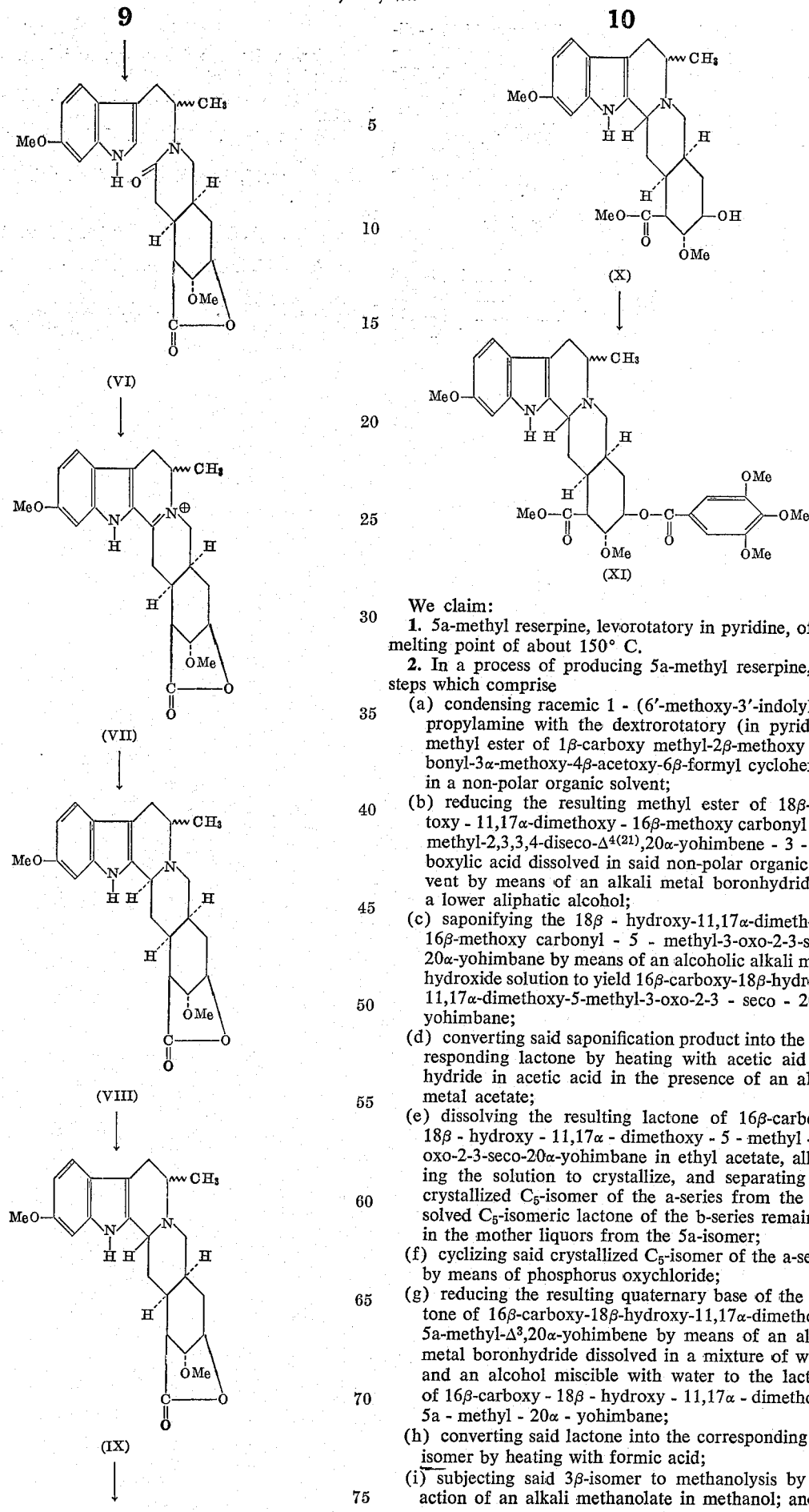

We claim:
1. 5a-methyl reserpine, levorotatory in pyridine, of the melting point of about 150° C.
2. In a process of producing 5a-methyl reserpine, the steps which comprise
 (a) condensing racemic 1 - (6'-methoxy-3'-indolyl)-2-propylamine with the dextrorotatory (in pyridine) methyl ester of 1β-carboxy methyl-2β-methoxy carbonyl-3α-methoxy-4β-acetoxy-6β-formyl cyclohexane in a non-polar organic solvent;
 (b) reducing the resulting methyl ester of 18β-acetoxy - 11,17α-dimethoxy - 16β-methoxy carbonyl - 5 - methyl-2,3,3,4-diseco-Δ⁴⁽²¹⁾,20α-yohimbene - 3 - carboxylic acid dissolved in said non-polar organic solvent by means of an alkali metal boronhydride in a lower aliphatic alcohol;
 (c) saponifying the 18β - hydroxy-11,17α-dimethoxy-16β-methoxy carbonyl - 5 - methyl-3-oxo-2-3-seco-20α-yohimbane by means of an alcoholic alkali metal hydroxide solution to yield 16β-carboxy-18β-hydroxy-11,17α-dimethoxy-5-methyl-3-oxo-2-3 - seco - 20α - yohimbane;
 (d) converting said saponification product into the corresponding lactone by heating with acetic aid anhydride in acetic acid in the presence of an alkali metal acetate;
 (e) dissolving the resulting lactone of 16β-carboxy-18β - hydroxy - 11,17α - dimethoxy - 5 - methyl - 3 - oxo-2-3-seco-20α-yohimbane in ethyl acetate, allowing the solution to crystallize, and separating the crystallized C₅-isomer of the a-series from the dissolved C₅-isomeric lactone of the b-series remaining in the mother liquors from the 5a-isomer;
 (f) cyclizing said crystallized C₅-isomer of the a-series by means of phosphorus oxychloride;
 (g) reducing the resulting quaternary base of the lactone of 16β-carboxy-18β-hydroxy-11,17α-dimethoxy-5a-methyl-Δ³,20α-yohimbene by means of an alkali metal boronhydride dissolved in a mixture of water and an alcohol miscible with water to the lactone of 16β-carboxy - 18β - hydroxy - 11,17α - dimethoxy-5a - methyl - 20α - yohimbane;
 (h) converting said lactone into the corresponding 3β-isomer by heating with formic acid;
 (i) subjecting said 3β-isomer to methanolysis by the action of an alkali methanolate in methanol; and

(j) esterifying the resulting 18β - hydroxy - 11,17α - dimethoxy - 16β - methoxy carbonyl - 5a - methyl - 3β,20α-yohimbane by means of 3,4,5-trimethoxy benzoychloride to yield the 5a-methyl reserpine.

3. The process according to claim 2, wherein the solvent used in step (a) is methylene chloride.

4. The process according to claim 2, wherein the alkali metal boronhydride used in steps (b) and (g) is potassium boronhydride in aqueous methanol.

References Cited by the Examiner
UNITED STATES PATENTS

| | | | |
|---|---|---|---|
| 2,786,844 | 3/1957 | MacPhillamy et al. | 260—236 |
| 2,883,384 | 4/1959 | Woodward | 260—287 |
| 2,952,682 | 9/1960 | Muller et al. | 260—236 |
| 2,986,562 | 5/1961 | Huebner | 260—236 |

OTHER REFERENCES

Karrer, Organic Chemistry, 2nd Eng. Ed., Elsevier, New York (1946), page 24.

Richter's Organic Chemistry, vol. IV (1947), page 222.

Velluz et al., Bull. Soc. Chim., France, pp. 673–7 (1958.)

Woodward, J. Am. Chem. Soc., vol. 78, pp. 2021–5 (1956).

WALTER A. MODANCE, *Primary Examiner.*

IRVING MARCUS, DUVAL T. McCUTCHEN,
*Examiners.*

J. E. PHILLIPS, JAMES A. PATTEN,
*Assistant Examiners.*